US011132322B2

(12) United States Patent
Delany et al.

(10) Patent No.: US 11,132,322 B2
(45) Date of Patent: Sep. 28, 2021

(54) DETERMINING A QUANTITY OF HOT SWAP CONTROLLERS (71) Applicant: Hewlett Packard Enterprise Development LP, Houston, TX (US)

(72) Inventors: Michael Delany, Houston, TX (US); Howard Leverenz, Houston, TX (US); Dylan A Quiroz, Houston, TX (US)

(73) Assignee: Hewlett. Packard Enterprise Development LP, Houston, TX (US)

( * ) Notice: Subject to any disclaimer, the term of this patent is extended or adjusted under 35 U.S.C. 154(b) by 683 days.

(21) Appl. No.: 15/922,148

(22) Filed: Mar. 15, 2018

(65) Prior Publication Data
US 2019/0286601 A1   Sep. 19, 2019

(51) Int. Cl.
*H02H 9/00* (2006.01)
*G06F 13/40* (2006.01)
*G05F 1/573* (2006.01)
*H02H 9/02* (2006.01)

(52) U.S. Cl.
CPC .......... *G06F 13/4081* (2013.01); *G05F 1/573* (2013.01); *H02H 9/004* (2013.01); *H02H 9/025* (2013.01)

(58) Field of Classification Search
None
See application file for complete search history.

(56) References Cited

U.S. PATENT DOCUMENTS

| | | | | |
|---|---|---|---|---|
| 6,018,204 A | * | 1/2000 | Kuruma | H02J 1/001 307/64 |
| 6,501,660 B1 | * | 12/2002 | Ho | G06F 13/4081 361/724 |
| 7,339,367 B2 | | 3/2008 | Heisler et al. | |
| 8,847,438 B2 | | 9/2014 | Steele et al. | |
| 2016/0226241 A1 | | 8/2016 | Dix et al. | |
| 2017/0126222 A1 | | 5/2017 | O'Sullivan et al. | |

OTHER PUBLICATIONS

Maxim Integrated; "Dual ORing, Single Hot-swap Controller with Accurate Current Monitoring"; printed from: https://datasheets.maximintegrated.com/en/ds/MAX15068.pd; Sep. 13, 2017: 17 pages.

* cited by examiner

*Primary Examiner* — Stephen W Jackson
(74) *Attorney, Agent, or Firm* — Brooks, Cameron & Huebsch, PLLC (57) ABSTRACT

A controller, comprising: a processing resource; and a memory resource storing machine-readable instructions to cause the processing resource to: activate a detection signal to enable a transistor coupled to the controller; determine a voltage associated with a plurality of hot swap controllers; and determine, in view of the voltage, a quantity of hot swap controllers included in the plurality of hot swap controllers.

18 Claims, 7 Drawing Sheets

DETERMINING A QUANTITY OF HOT SWAP CONTROLLERS

BACKGROUND

A plurality of servers may be organized as server blades arranged in a server rack. A plurality of such server racks may be included in a data center, for example. Power requirements of the plurality of servers may depend on the quantity of servers being powered at a given time. The data center may be used for the storage and retrieval of customer data, for example.

DETAILED DESCRIPTION

In a number of examples, data centers may include a plurality of servers arranged in server racks. A server rack may include a plurality of servers and a backplane that is connected to the plurality of servers. The plurality of servers arranged along the backplane in this manner may be referred to as a plurality of blades, in a number of examples. Some of the servers stacked in a server rack in this manner may be disengaged or removed from the server rack for a period of time, for example, to reduce storage capacity of the data center or when the data center is undergoing maintenance. Some servers may be inserted into the server rack at certain times, for example, to add storage capacity. In an undesirable scenario, an overcurrent event may occur when a server is added or removed from the server rack.

In a number of examples, hot swap controllers (also referred to herein as phases or soft start controllers) coupled to the plurality of servers allow for the addition and removal of servers from a server rack without interruption of power supply to servers that are not being added or removed. Uninterrupted functionality of the data center is maintained in this manner while avoiding overcurrent events during addition/removal of servers. Power may flow from a power distribution network, through a number of hot swap controllers, to the plurality of servers. In certain undesirable scenarios, the startup process of the plurality of hot swap controllers and/or the plurality of servers can include an overcurrent event that may damage the plurality of servers and/or the plurality of hot swap controllers.

In a number of examples, a quantity of hot swap controllers being utilized may be used to calibrate a power supply provided to the hot swap controllers during a startup process of the plurality of servers in a way that avoids damaging overcurrent events. In some implementations, the quantity of hot swap controllers being utilized may be difficult to determine because of a lack of digital communication between the hot swap controllers and other components. In a number of examples, circuitry such as a hot swap controller system can be utilized to determine the quantity of hot swap controllers coupled to the plurality of servers in order to properly calibrate the amount of power provided to the hot swap controllers and/or the plurality of servers. In a number of examples, the hot swap controller system includes a programmable controller coupled to a transistor, which in turn is connected to the plurality of hot swap controllers. In some implementations, the transistor is connected to sense resistors of the hot swap controller, with a sense resistor of a hot swap controller being configured to detect a current passing through the hot swap controller. In order to determine the quantity of hot swap controllers, the programmable controller activates a detection signal to enable the transistor. The programmable controller proceeds to determine a voltage at a drain of the transistor (the drain of the transistor being connected to the sense resistors of the hot swap controllers). In view of the voltage at the drain of the transistor, the quantity of hot swap controllers can be determined by performing a lookup in a pre-stored table or by solving an equation in other implementations. In a number of examples, the programmable controller determines the quantity of hot swap controllers in order to calibrate a startup sequence of the hot swap controllers.

It may be beneficial to include a hot swap controller system in a server rack that has hot swap controllers, as disclosed. Different customers may desire differing quantities of hot swap controllers in the server rack depending on system characteristics. A quantity of hot swap controllers can be stored in a memory of firmware included in the server rack. This use of differing firmware for different customer implementations can be costly and inefficient. Utilizing a hot swap controller system, as disclosed, allows for the use of a single firmware regardless of a quantity of hot swap controllers included in a server rack.

The figures herein follow a numbering convention in which the first digit corresponds to the drawing figure number and the remaining digits identify an element or component in the drawing. For example, reference numeral 104 may refer to element "04" in FIG. 1 and an analogous element may be identified by reference numeral 204 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure and should not be taken in a limiting sense.

Figure 1:
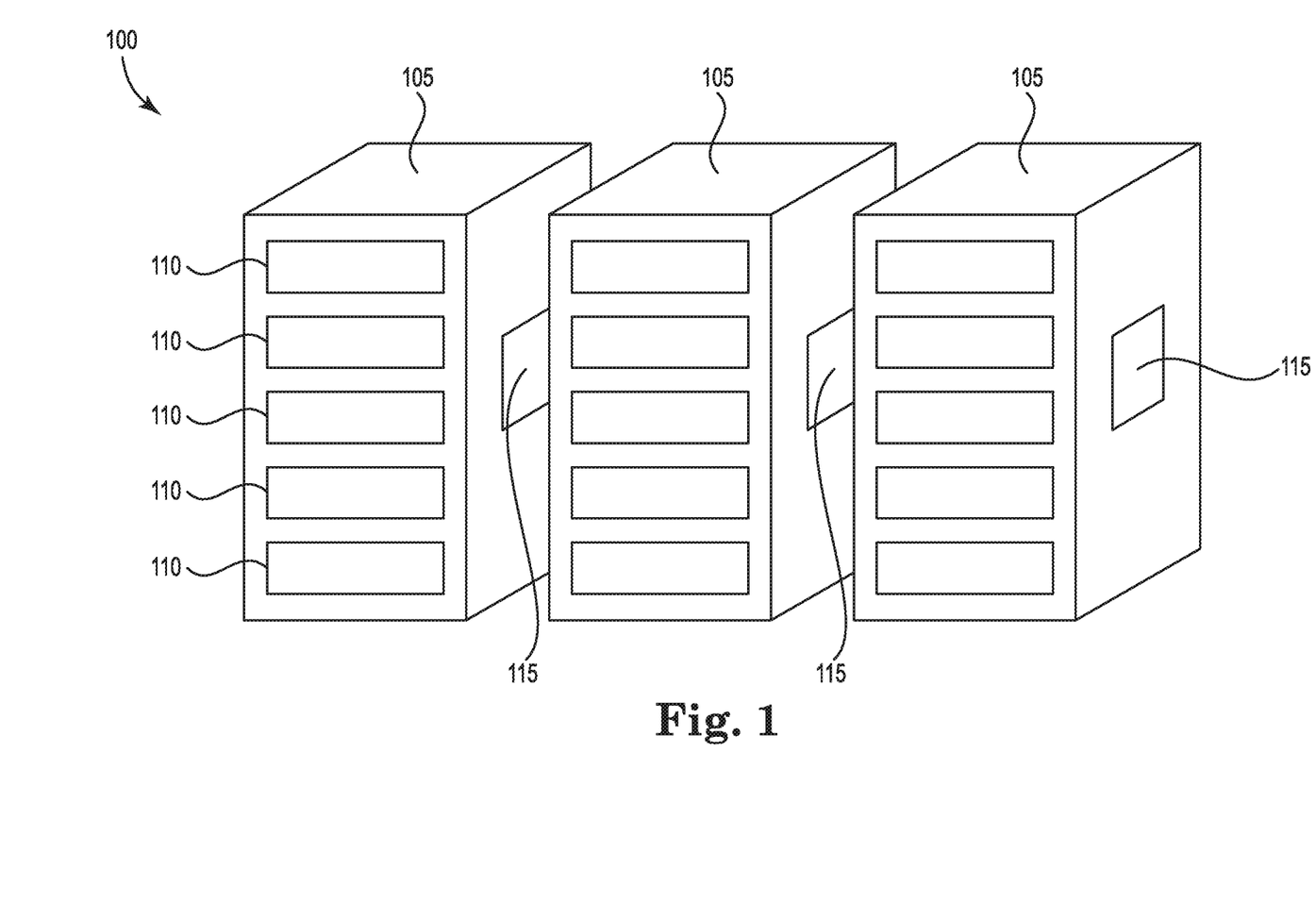
FIG. 1 illustrates an example environment in which systems for determining a quantity of hot swap controllers consistent with the disclosure may be implemented.

FIG. 1 illustrates an example environment in which systems for determining a quantity of hot swap controllers consistent with the disclosure may be implemented. As shown in FIG. 1, a data center 100 includes a plurality of server racks 105, each containing a plurality of servers 110. In some implementations, the servers 110 may be stacked as shown. The server 110 may be a computing device that stores data and/or manages access to a centralized resource or service in a network. For example, the server 110 may refer to a blade server, a modular blade server, a database server, a file server, a web server, an application server, etc. As further shown in FIG. 1, each server rack 105 includes a hot swap controller system 115.

Figure 2:
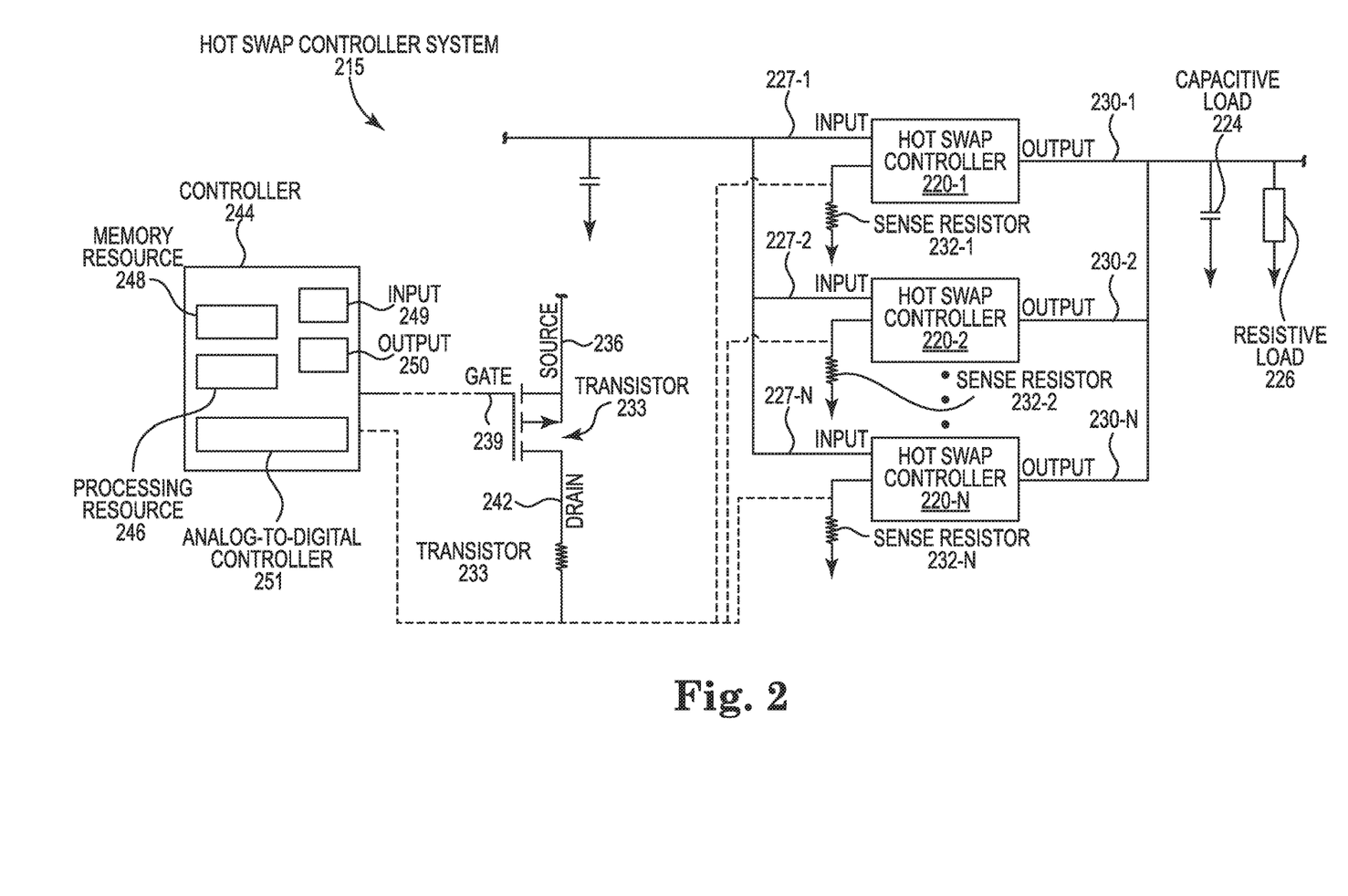
FIG. 2 illustrates an example of a hot swap controller system for determining a quantity of hot swap controllers consistent with the disclosure.

FIG. 2 illustrates an example of a hot swap controller system for determining a quantity of hot swap controllers consistent with the disclosure. As shown in FIG. 2, a hot swap controller system 215 includes a plurality of HSCs 220-1 . . . 220-N, where the plurality of HSCs 220-1 . . . 220-N are connected to a capacitive load 224 of a plurality of servers connected to the HSCs 220-1 . . . 220-N, and where the plurality of HSCs 220-1 . . . 220-N are further connected to a resistive load 226 of the plurality of servers connected to the HSCs 220-1 . . . 220-N. As further shown in FIG. 2, the HSCs 220-1 . . . 220-N include inputs 227-1 . . . 227-N, respectively, where each of the inputs 227-1 . . . 227-N receives power from a power distribution network. The HSCs 220-1 . . . 220-N may further include outputs 230-1 . . . 230-N, respectively, where each of the outputs 230-1 . . . 230-N is connected to the capacitive load 224 and the resistive load 227. Additionally, a plurality of sense currents 231-1 . . . 231-N belonging to the plurality of HSCs 220-1 . . . 220-N, respectively, may be drawn out of the HSCs 220-1 . . . 220-N, as shown. A plurality of sense resistors 232-1 . . . 232-N may be situated along the sense currents 231-1 . . . 231-N to develop a measurable voltage.

The HSC system 215 further includes a transistor 233 that is connected via a drain of the transistor 233 to the HSCs 220-1 . . . 220-N. The transistor 233 may refer to a metal-oxide-semiconductor field-effect transistor ("MOSFET"), a bipolar-junction transistor ("BJT"), a junction gate field-effect transistor ("JFET"), a dual gate MOSFET, etc. The transistor 233 has a source 236, a gate 239, and a drain 242. The HSC system 215 further includes a programmable controller 244 that is connected to the transistor 233. The programmable controller 244 may be an integrated circuit that contains all the functions of a central processing unit and may refer to a microprocessor, microcontroller, etc.

As shown in FIG. 2, the controller 244 includes a processing resource 246 and a memory resource 248. The processing resource 246 may be a hardware processing unit such as a microprocessor, application specific instruction set processor, coprocessor, network processor, or similar hardware circuitry that can cause machine-readable instructions to be executed. The memory resource 248 may be any type of volatile or non-volatile memory or storage, such as random-access memory (RAM), flash memory, read-only memory (ROM), storage volumes, a hard disk, or a combination thereof. The memory resource 248 may store instructions thereon. When executed by the processing resource 246, the instructions may cause the controller 244 to perform certain tasks as described in greater detail below.

The programmable controller 244 may further include an input 249 and an output 250. Additionally, the programmable controller 244 may include an analog-to-digital converter 251 or may be coupled to an analog-to-digital converter 251 that is a part of the HSC system 215. The analog-to-digital converter 251 may be integral with the controller 244. The analog-to-digital converter 251 may detect a voltage at a drain of the transistor 233 and provides information indicating the voltage to the controller 244. As further shown in FIG. 2, the programmable controller 244 may be connected to the gate 239 of the transistor 233 as well as to the drain 242 of the transistor 233. The drain 242 of the transistor 233 may be connected to each of the sense currents 231-1 . . . 231-N such that a voltage developed at sense resistors 232-1 . . . 232-N can be detected at the drain 242. In a number of examples, a sense current of a HSC is a fraction of a current being provided to the plurality of servers at an output of the HSC. In some implementations, the controller 244 may activate a detection signal at the gate 239 of the transistor, measure a voltage resulting from a combination of the sense resistors 232-1 . . . 232-N, and determine a quantity N of HSCs in view of the voltage.

Figure 3:
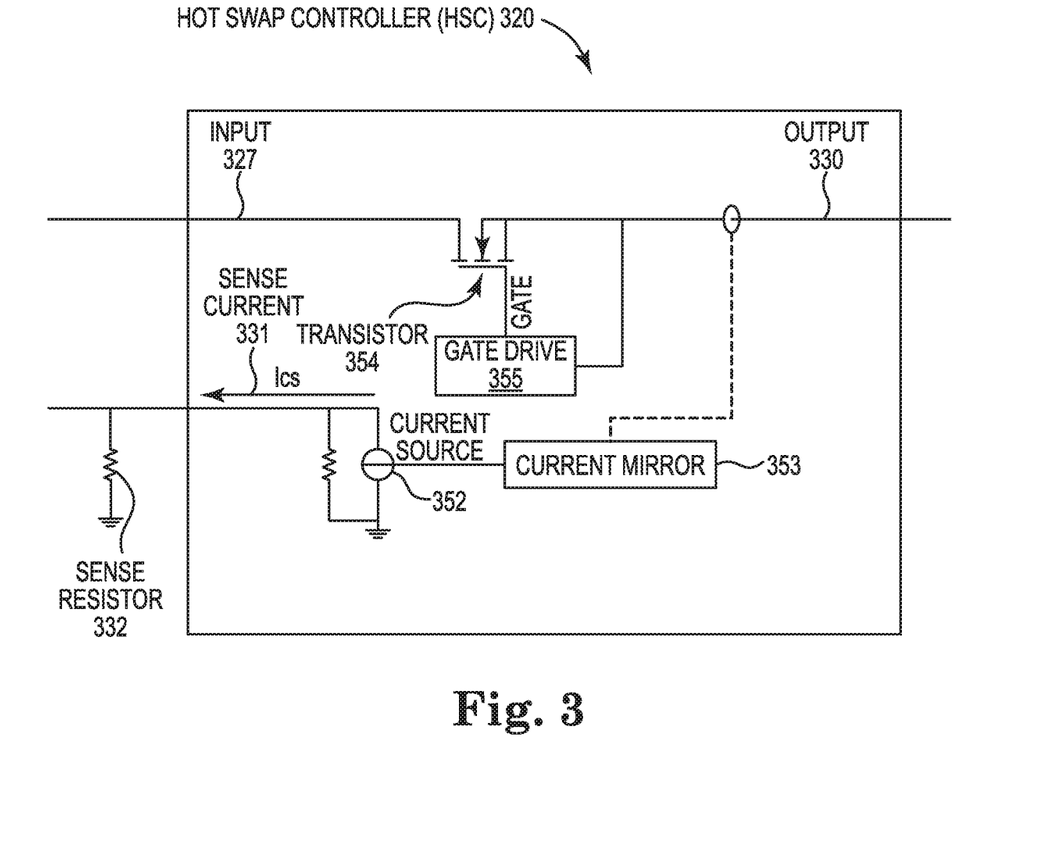
FIG. 3 illustrates an example of a hot swap controller consistent with the disclosure.

FIG. 3 illustrates an example of a hot swap controller consistent with the disclosure. As shown, an HSC 320 includes an input 327, an output 330, a sense current 331 that acts as a current source 352 proportional to the current flowing from input to output, and a sense resistor 332 usable to develop a voltage that can be measured by an analog to digital converter of a programmable controller connected to the HSC 320. Voltages measured at a plurality of sense resistors belonging to a plurality of HSCs can be used to determine a quantity of HSCs, as described below in detail in connection with FIGS. 4A and 4B. Still referring to FIG. 3, the quantity of HSCs can be used to calibrate a current provided to an input 327 of a HSC 320, for example, in order to avoid an undesirable overcurrent event that can damage the HSC 320 or components therein. The current source 352 is included in the HSC 320 and is coupled to a current mirror 353 coupled to a current running between the input 327 and the output 330. The HSC 320 further includes a transistor 354 and a gate drive 355 coupled to a gate of the transistor. Additionally, the gate drive 355 may be coupled to a current running between a source of the transistor 354 and the output 330. In some implementations, the gate drive 355 increases an applied gate voltage on the transistor 354 to soft start a voltage on the output 330 in order to ensure that a plurality of servers downstream of the HSC 320 and connected to the output 330 do not experience an undesirable overcurrent event. In some implementations, the current mirror 353 senses a current running to the output 330 and amplifies it depending on the configuration of the HSC 320. In a number of examples, the current mirror 353 and/or the current source 352 may provide 10 microamps as a sense current 331 per amp going to the output 330. The 10 microamp sense current 331 is driven by the current source 352.

Figure 4A:
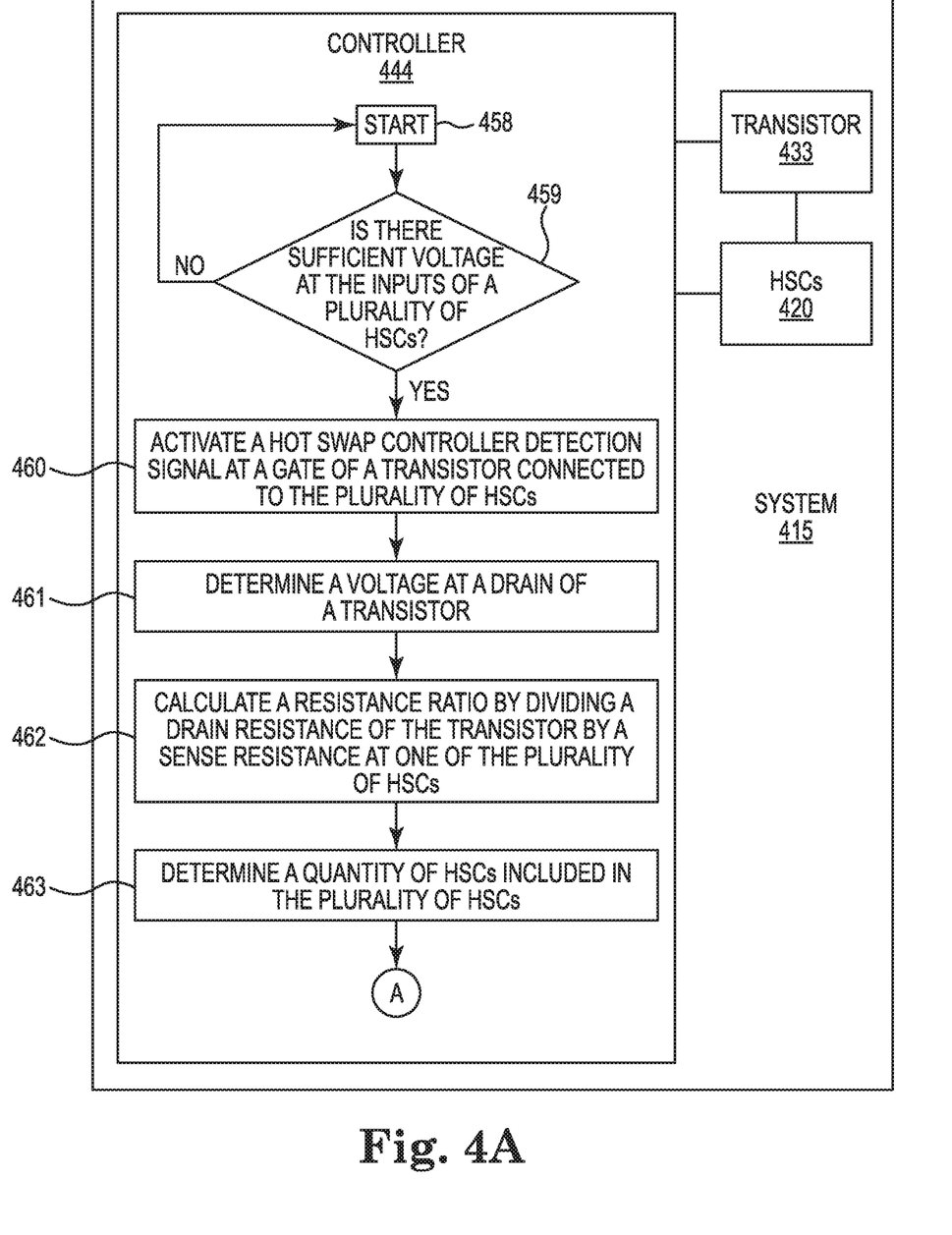
FIGS. 4A and 4B illustrate an example of a system for determining a quantity of hot swap controllers consistent with the disclosure.
Figure 4B:
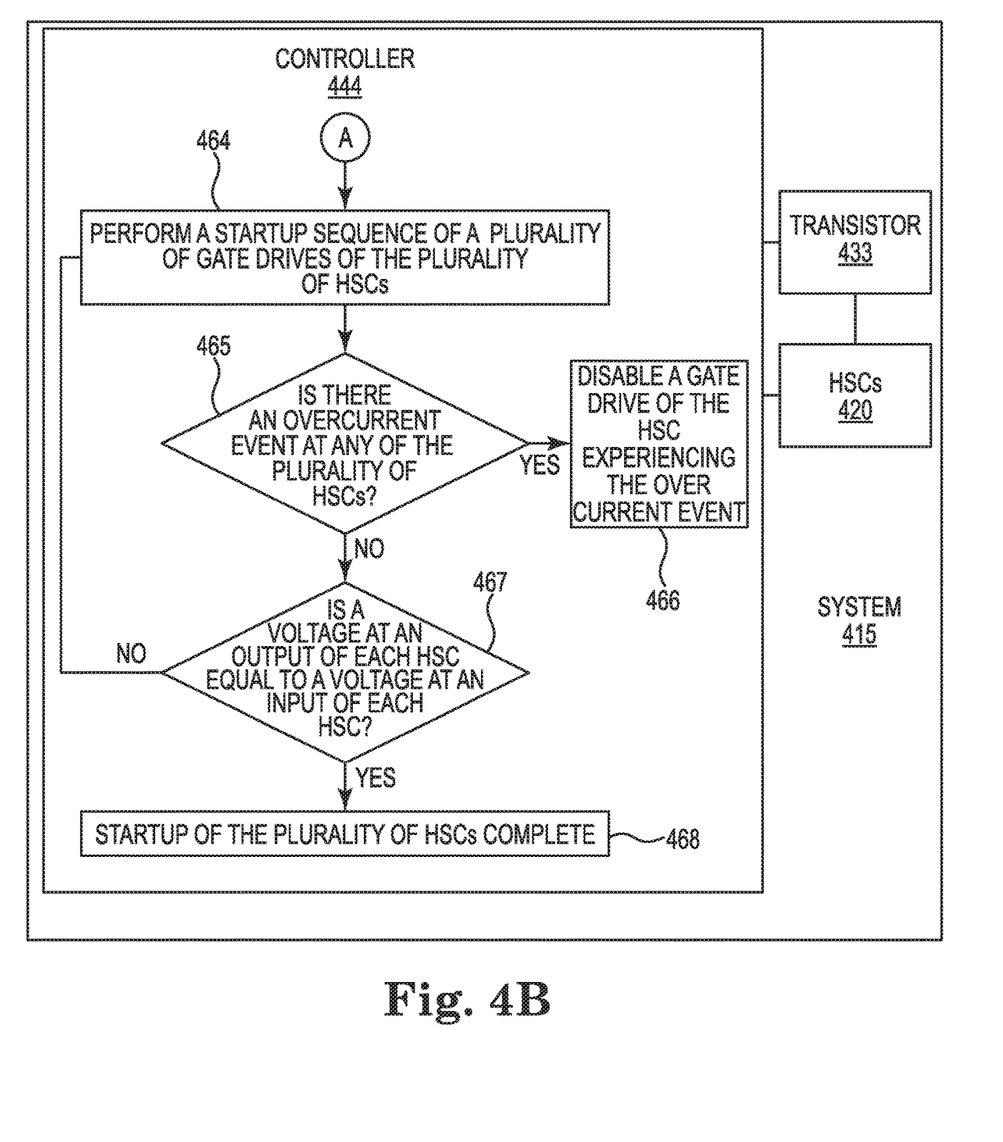

FIGS. 4A and 4B illustrate an example of a system for determining a quantity of HSCs consistent with the disclosure. As shown, the system 415 (sometimes referred to herein as a HSC system 415) may include a controller 444 such as a programmable controller, a transistor 433 connected to the controller 444, and a plurality of HSCs 420 connected to the transistor 433. The plurality of HSCs 420 may be connected to a plurality of servers of a server rack. The controller 444 may include a processing resource and a memory resource. In a number of examples, the memory resource of the controller 444 may store machine-readable instructions to cause the processing resource to perform some or all of 459 to 468 of FIGS. 4A and 4B. In a number of examples, the system 415 may perform some or all of 459 to 468 of FIGS. 4A and 4B. In a number of examples, one of or some combination of the controller 444, the transistor 433, the plurality of HSCs 420, an analog-to-digital converter included in the system 415, or another component of the HSC system 415, may perform some or all of 459 to 468 of FIGS. 4A and 4B.

At block 458, the controller 444 of the system 415 may start a process of determining a quantity of HSCs 420 and powering-on the HSCs 420 and/or the plurality of servers connected to the HSCs 420. At block 459, the controller 444 may determine whether there is sufficient voltage at the inputs of a plurality of HSCs 420. If there is not sufficient voltage at the inputs of the plurality of HSCs 420, the controller 444 may re-start at block 458. The voltage may be necessary, for example, to start the HSCs 420 properly. At block 460, if there is sufficient voltage at the inputs of the plurality of HSCs 420, the controller 444 may activate a HSC detection signal at a gate of a transistor connected to the plurality of HSCs. The HSC detection signal may cause a voltage at a source of the transistor 433 as well as a voltage at a drain of the transistor 433.

At block 461, the controller 444 may determine a voltage at a drain of the transistor 433. In a number of examples, analog-to-digital converter connected to the controller 444 or a part of the controller 444 may detect a voltage at the drain of the transistor. The analog-to-digital converter of the controller 444 may provide a signal to the controller 444 identifying the voltage at the drain of the transistor 433.

At block 462, the controller 444 of the system 415 may calculate a resistance ratio by dividing a drain resistance of the transistor 433 by a sense resistance at one of the plurality of HSCs 420. The drain resistance may refer to a resistance at a drain of the transistor 433. The sense resistance may refer to a resistance at a sense resistor at one of the plurality of HSCs 420.

At block 463, the controller 444 of the system 415 may determine a quantity of HSCs 420 included in the plurality of HSCs 420. In some implementations, the controller 444 may determine the quantity of HSCs 420 in view of the voltage at the drain of the transistor 433 and in view of the resistance ratio. In a number of examples, the controller 444 may calculate a gain of the transistor 433 in view of the voltage at the drain of the transistor 433. In particular, the controller may calculate the gain of the transistor 433 by dividing a voltage detected at a source of the transistor 433 by the voltage detected at the drain of the transistor, in a number of examples. In a number of examples, the controller 444, when determining the quantity of HSCs 420, may perform a lookup in a lookup table stored in a memory of the controller 444. In a number of examples, the controller 444 may perform the lookup in the below lookup table:

TABLE 1

| Quantity of Hot Swap Controllers (HSCs) | Resistance Ratio = 2 | Resistance Ratio = 2.25 | Resistance Ratio = 2.5 |
|---|---|---|---|
| 1 | 0.333333 | 0.307692 | 0.285714 |
| 2 | 0.200000 | 0.181818 | 0.166666 |
| 3 | 0.142857 | 0.129032 | 0.117647 |
| 4 | 0.111111 | 0.100000 | 0.090909 |
| 5 | 0.090909 | 0.081632 | 0.074074 |
| 6 | 0.076923 | 0.068965 | 0.062500 |

The controller 444 can determine a quantity of HSCs 420 in view of a gain and a resistance ratio by performing a lookup in the above lookup table. For example, in view of a resistance ratio of 2 and a gain of 0.111111, the controller 444 may determine that there are 4 HSCs 420 in the plurality of HSCs 42. As another example, in view of a resistance ratio of 2.5 and a gain value of 0.117647, the controller 444 may determine that there are three HSCs 420 included in the plurality of HSCs 420. In a number of examples, the resistance ratio and/or the gain may not match an exact value provided in the lookup table, such as table 1 shown above. In such a circumstance, the controller 444 may perform the lookup using closest matches found in the lookup table to approximate a quantity of HSCs 420 in the plurality of HSCs 420. For example, the controller 444 may determine that the resistance ratio is 2.3 and the gain value is 0.120. In such a circumstance, the controller 444 may lookup the resistance ratio of 2.25 since it is closest to 2.3 and a gain value of 0.129032 since it is the closest gain to 0.120 under the resistance ratio of 2.25, to determine that the quantity of HSCs 420 is three.

Additionally, or alternatively, the controller 444, when determining the quantity of HSCs 420, may solve an equation having variables for the resistance ratio, the gain of the transistor 433, and the quantity of HSCs 420 as three unknown variables, where the quantity of HSCs 420 can be determined in view of a given value for the resistance ratio and the gain of the transistor 433. In a number of examples, the controller 444 may solve the following equation:

$$\text{Gain} = \frac{1}{1 + \text{Quantity of } HSCs \times \text{Resistance Ratio}}$$

For example, the controller may determine that the quantity of HSCs 420 is five in view of a resistance ratio of 2.5 and a gain of 0.074074. In a number of examples, the quantity of HSCs 420 determined in view of the gain and the resistance ratio may not be a whole number and may be rounded to the nearest whole number to determine a quantity of HSCs 420. For example, the controller may determine that the quantity of HSCs 420 is five in view of a resistance ratio of 2.5 and a gain of 0.76.

The controller 444 may utilize a quantity of HSCs 420 included in the plurality of HSCs 420 to calibrate a startup sequence of the plurality of HSCs 420 in order to prevent an inrush of overcurrent that may damage the HSCs 420 and/or the plurality of servers connected thereto.

At block 464 of FIG. 4B, the controller 444 of the system 415 may perform a startup sequence of a plurality of gate drives of the plurality of HSCs 420 in view of a quantity of HSCs 420 included in the HSCs 420. At block 465, the controller 444 may determine whether there is an overcurrent event at any of the plurality of HSCs 420. At block 466, if there is an overcurrent event at one of the plurality of HSCs 420, the controller 444 may disable a gate drive of the HSC 420 experiencing the overcurrent event. In a number of examples, the disabling of the gate drive may be to prevent damage to the plurality of servers.

At block 467, if there is not an overcurrent event at any of the plurality of HSCs 420, the controller 444 may determine whether a voltage at an output of each HSC 420 is equal to a voltage at an input of each HSC 420. If the voltage at the output of each HSC 420 is not equal to the voltage at the input of each HSC 420, the controller 444 may perform the startup sequence of the plurality of gate drives of the plurality of HSCs in view of the quantity of HSCs 420 included in the HSCs 420 (block 464).

At block 468, if the voltage at the output of each HSC 420 is equal to the input of each HSC 420, the controller 444 of the HSC system 415 may determine that the startup of the plurality of HSCs 420 is complete. Performing the startup of the plurality of HSCs in view of the quantity of HSCs in the manner described above reduces the likelihood of overcurrent events. In a number of examples, determining the quantity of HSCs in the manner described above allows for the use of a single firmware on server racks having different numbers of HSCs instead of using different firmware depending on customer choice regarding the quantity of HSCs.

Figure 5:
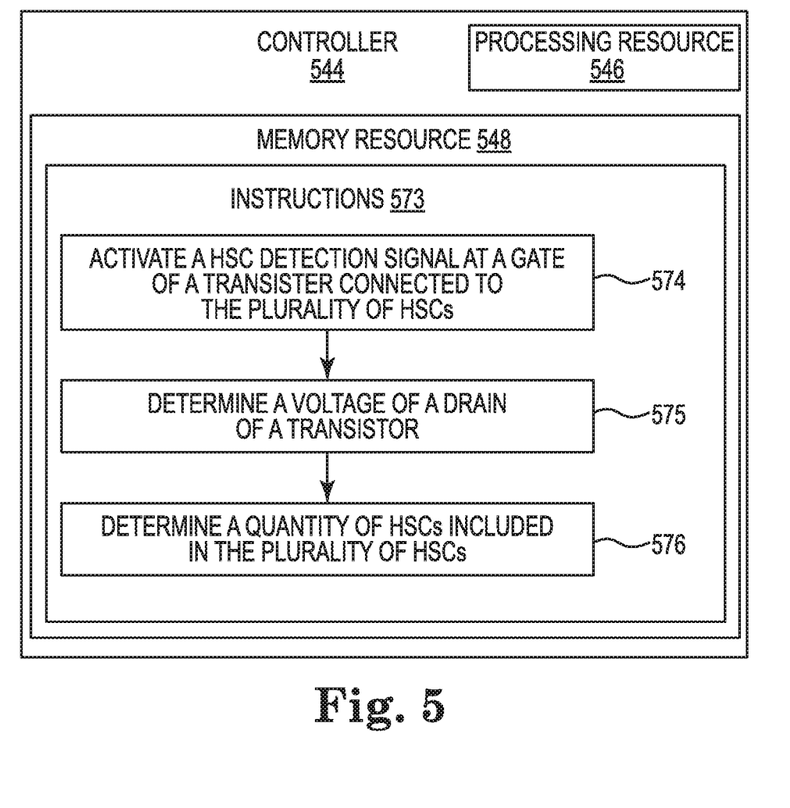
FIG. 5 illustrates an example of a controller for determining a quantity of HSCs consistent with the disclosure.

FIG. 5 illustrates an example of a controller (e.g., a programmable controller) for determining a quantity of HSCs consistent with the disclosure. A transistor may be connected to the controller 544, and a plurality of HSCs may be connected to the transistor. The plurality of HSCs may be connected to a plurality of servers of a server rack. The controller 544 may include a processing resource 546 and a memory resource 548, as shown in FIG. 5. In a number of examples, the memory resource 548 of the controller 544 may store machine-readable instructions 573 to cause the processing resource 546 to perform some or all of 574 to 576 of FIG. 5. In a number of examples, the system may perform some or all of 574 to 576 of FIG. 5. In a number of examples, one of or some combination of the controller 544, the transistor, the plurality of HSCs, an analog-to-digital converter included in the system, or another component of the HSC system, may perform some or all of 574 to 576 of FIG. 5.

At block 574, if there is sufficient voltage at the inputs of the plurality of HSCs, the processing resource 546 of the controller 544 may activate a HSC detection signal at a gate of a transistor connected to the plurality of HSCs. The HSC detection signal may cause a voltage at a source of the transistor as well as a voltage at a drain of the transistor.

At block 575, the processing resource 546 of the controller 544 may determine a voltage at a drain of the transistor. In a number of examples, an analog-to-digital converter connected to the controller 544 or a part of the controller 544 may detect a voltage at the drain of the transistor. The analog-to-digital converter of the controller 544 may provide a signal to the controller 544 identifying the voltage at the drain of the transistor.

Additionally, or alternatively, the processing resource 546 of the controller 544 of the system may calculate a resistance ratio by dividing a drain resistance of the transistor by a sense resistance at one of the plurality of HSCs. The drain resistance may refer to a resistance at a drain of the transistor. The sense resistance may refer to a resistance at a sense resistor at one of the plurality of HSCs.

At block 576, the processing resource 546 of the controller 544 of the system may determine a quantity of HSCs included in the plurality of HSCs. In some implementations, the processing resource 546 may determine the quantity of HSCs in view of the voltage at the drain of the transistor and in view of the resistance ratio. In a number of examples, the processing resource 546 may calculate a gain of the transistor in view of the voltage at the drain of the transistor. In particular, the processing resource 546 may calculate the gain of the transistor by dividing a voltage detected at a source of the transistor by the voltage detected at the drain of the transistor, in a number of examples. In a number of examples, the processing resource 546 of the controller 544, when determining the quantity of HSCs, may perform a lookup in a lookup table stored in the memory 548 of the controller 544. In a number of examples, the processing resource 546 may perform the lookup in the below lookup table:

TABLE 1

| Quantity of Hot Swap Controllers (HSCs) | Resistance Ratio = 2 | Resistance Ratio = 2.25 | Resistance Ratio = 2.5 |
|---|---|---|---|
| 1 | 0.333333 | 0.307692 | 0.285714 |
| 2 | 0.200000 | 0.181818 | 0.166666 |
| 3 | 0.142857 | 0.129032 | 0.117647 |
| 4 | 0.111111 | 0.100000 | 0.090909 |
| 5 | 0.090909 | 0.081632 | 0.074074 |
| 6 | 0.076923 | 0.068965 | 0.062500 |

The processing resource 546 can determine a quantity of HSCs in view of a gain and a resistance ratio by performing a lookup in the above lookup table. For example, in view of a resistance ratio of 2 and a gain of 0.111111, the processing resource 546 may determine that there are 4 HSCs in the plurality of HSCs 42. As another example, in view of a resistance ratio of 2.5 and a gain value of 0.117647, the processing resource 546 may determine that there are three HSCs included in the plurality of HSCs. In a number of examples, the resistance ratio and/or the gain may not match an exact value provided in the lookup table, such as table 1 shown above. In such a circumstance, the processing resource 546 may perform the lookup using closest matches found in the lookup table to approximate a quantity of HSCs in the plurality of HSCs. For example, the processing resource 546 may determine that the resistance ratio is 2.3 and the gain value is 0.120. In such a circumstance, the processing resource 546 may lookup the resistance ratio of 2.25 since it is closest to 2.3 and a gain value of 0.129032 since it is the closest gain to 0.120 under the resistance ratio of 2.25, to determine that the quantity of HSCs is three.

Additionally, or alternatively, the processing resource 546, when determining the quantity of HSCs, may solve an equation having the resistance ratio, the gain of the transistor, and the quantity of HSCs as the three unknown variables, where the quantity of HSCs can be determined in view of a given value for the resistance ratio and the gain of the transistor. In a number of examples, the processing resource 546 may solve the following equation:

$$\text{Gain} = \frac{1}{1 + \text{Quantity of } HSCs \times \text{Resistance Ratio}}$$

For example, the processing resource 546 may determine that the quantity of HSCs is five in view of a resistance ratio of 2.5 and a gain of 0.074074. In a number of examples, the quantity of HSCs determined in view of the gain and the resistance ratio may not be a whole number and may be rounded to the nearest whole number to determine a quantity of HSCs. For example, the processing resource 546 may determine that the quantity of HSCs is five in view of a resistance ratio of 2.5 and a gain of 0.76. Additionally, or alternatively, the processing resource 546 of the controller 544 may perform a startup sequence of a plurality of gate drives of the plurality of HSCs in view of a quantity of HSCs included in the HSCs.

The controller 544 may utilize a quantity of HSCs included in the plurality of HSCs to calibrate a startup sequence of the plurality of HSCs in order to prevent an inrush of overcurrent that may damage the HSCs and/or the plurality of servers connected thereto. Performing the startup of the plurality of HSCs in view of the quantity of HSCs in the manner described above reduces the likelihood of overcurrent events. In a number of examples, determining the quantity of HSCs in the manner described above allows for the use of a single firmware on server racks having different numbers of HSCs instead of using different firmware depending on customer choice regarding the quantity of HSCs.

Figure 6:
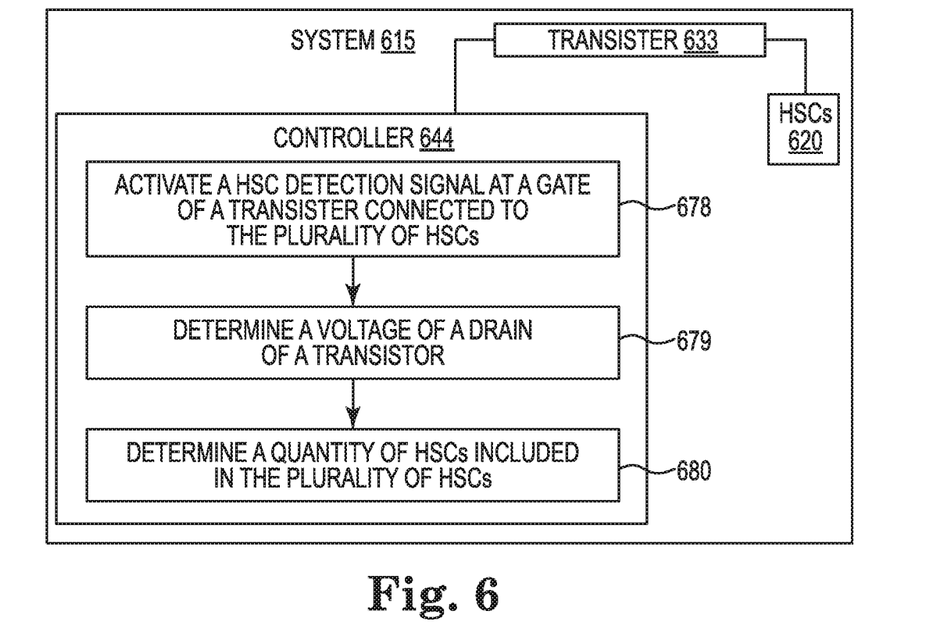
FIG. 6 illustrates an example of a system for determining a quantity of HSCs consistent with the disclosure.

FIG. 6 illustrates an example of a system for determining a quantity of HSCs consistent with the disclosure. As shown, the system 615 (sometimes referred to herein as a HSC system 615) may include a controller 644 such as a programmable controller, a transistor 633 connected to the controller 644, and a plurality of HSCs 620-1 . . . 620-N (sometimes referred to herein as HSCs 620) connected to the transistor 633. The plurality of HSCs 620 may be connected to a plurality of servers of a server rack. The controller 644 may include a processing resource and a memory resource.

In a number of examples, the memory resource of the controller 644 may store machine-readable instructions to cause the processing resource to perform some or all of 678 to 680 of FIG. 6. In a number of examples, the system 615 may perform some or all of 678 to 680 of FIG. 6. In a number of examples, one of or some combination of the controller 644, the transistor 633, the plurality of HSCs 620, an analog-to-digital converter included in the system 615, or another component of the HSC system 615, may perform some or all of 678 to 680 of FIG. 6.

At block 678, if there is sufficient voltage at the inputs of the plurality of HSCs 620, the controller 644 may activate a HSC detection signal at a gate of a transistor connected to the plurality of HSCs. The HSC detection signal may cause a voltage at a source of the transistor 633 as well as a voltage at a drain of the transistor 633.

At block 679, the controller 644 may determine a voltage at a drain of the transistor 633. In a number of examples, analog-to-digital converter connected to the controller 644 or a part of the controller 644 may detect a voltage at the drain of the transistor. The analog-to-digital converter of the controller 644 may provide a signal to the controller 644 identifying the voltage at the drain of the transistor 633.

Additionally, or alternatively, the controller 644 of the system 615 may calculate a resistance ratio by dividing a drain resistance of the transistor 633 by a sense resistance at one of the plurality of HSCs 620. The drain resistance may refer to a resistance at a drain of the transistor 633. The sense resistance may refer to a resistance at a sense resistor at one of the plurality of HSCs 620.

At block 680, the controller 644 of the system 615 may determine a quantity of HSCs 620 included in the plurality of HSCs 620. In some implementations, the controller 644 may determine the quantity of HSCs 620 in view of the voltage at the drain of the transistor 633 and in view of the resistance ratio. In a number of examples, the controller 644 may calculate a gain of the transistor 633 in view of the voltage at the drain of the transistor 633. In particular, the controller may calculate the gain of the transistor 633 by dividing a voltage detected at a source of the transistor 633 by the voltage detected at the drain of the transistor, in a number of examples. In a number of examples, the controller 644, when determining the quantity of HSCs 620, may perform a lookup in a lookup table stored in a memory of the controller 644. In a number of examples, the controller 644 may perform the lookup in the below lookup table:

TABLE 1

| Quantity of Hot Swap Controllers (HSCs) | Resistance Ratio = 2 | Resistance Ratio = 2.25 | Resistance Ratio = 2.5 |
| --- | --- | --- | --- |
| 1 | 0.333333 | 0.307692 | 0.285714 |
| 2 | 0.200000 | 0.181818 | 0.166666 |
| 3 | 0.142857 | 0.129032 | 0.117647 |
| 4 | 0.111111 | 0.100000 | 0.090909 |
| 5 | 0.090909 | 0.081632 | 0.074074 |
| 6 | 0.076923 | 0.068965 | 0.062500 |

The controller 644 can determine a quantity of HSCs 620 in view of a gain and a resistance ratio by performing a lookup in the above lookup table. For example, in view of a resistance ratio of 2 and a gain of 0.111111, the controller 644 may determine that there are 4 HSCs 620 in the plurality of HSCs 42. As another example, in view of a resistance ratio of 2.5 and a gain value of 0.117647, the controller 644 may determine that there are three HSCs 620 included in the plurality of HSCs 620. In a number of examples, the resistance ratio and/or the gain may not match an exact value provided in the lookup table, such as table 1 shown above. In such a circumstance, the controller 644 may perform the lookup using closest matches found in the lookup table to approximate a quantity of HSCs 620 in the plurality of HSCs 620. For example, the controller 644 may determine that the resistance ratio is 2.3 and the gain value is 0.120. In such a circumstance, the controller 644 may lookup the resistance ratio of 2.25 since it is closest to 2.3 and a gain value of 0.129032 since it is the closest gain to 0.120 under the resistance ratio of 2.25, to determine that the quantity of HSCs 620 is three.

Additionally, or alternatively, the controller 644, when determining the quantity of HSCs 620, may solve an equation having the resistance ratio, the gain of the transistor 633, and the quantity of HSCs 620 as the three unknown variables, where the quantity of HSCs 620 can be determined in view of a given value for the resistance ratio and the gain of the transistor 633. In a number of examples, the controller 644 may solve the following equation:

$$\text{Gain} = \frac{1}{1 + \text{Quantity of } HSCs \times \text{Resistance Ratio}}$$

For example, the controller may determine that the quantity of HSCs 620 is five in view of a resistance ratio of 2.5 and a gain of 0.074074. In a number of examples, the quantity of HSCs 620 determined in view of the gain and the resistance ratio may not be a whole number and may be rounded to the nearest whole number to determine a quantity of HSCs 620. For example, the controller may determine that the quantity of HSCs 620 is five in view of a resistance ratio of 2.5 and a gain of 0.76.

The controller 644 may utilize a quantity of HSCs 620 included in the plurality of HSCs 620 to calibrate a startup sequence of the plurality of HSCs 620 in order to prevent an inrush of overcurrent that may damage the HSCs 620 and/or the plurality of servers connected thereto.

Additionally or alternatively, the controller 644 of the system 615 may perform a startup sequence of a plurality of gate drives of the plurality of HSCs 620 in view of a quantity of HSCs 620 included in the HSCs 620.

Performing the startup of the plurality of HSCs in view of the quantity of HSCs in the manner described above reduces the likelihood of overcurrent events. In a number of examples, determining the quantity of HSCs in the manner described above allows for the use of a single firmware on server racks having different numbers of HSCs instead of using different firmware depending on customer choice regarding the quantity of HSCs.

Figure 7:
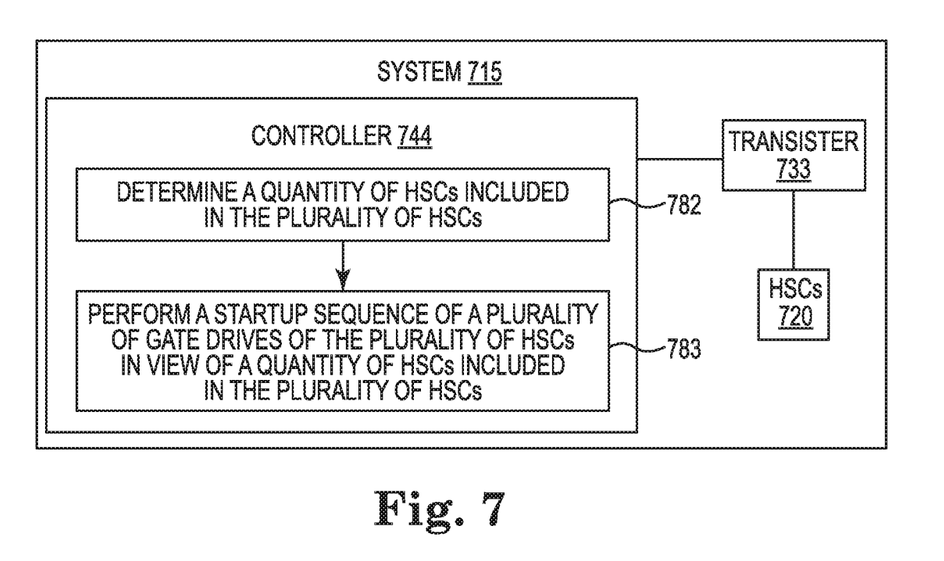
FIG. 7 illustrates an example of a system for determining a quantity of HSCs and performing a startup sequence of the HSCs consistent with the disclosure.

FIG. 7 illustrates an example of a system for determining a quantity of HSCs and performing a startup sequence of the HSCs consistent with the disclosure. As shown, the system 715 (sometimes referred to herein as a HSC system 715) may include a controller 744 such as a programmable controller, a transistor 733 connected to the controller 744, and a plurality of HSCs 720 connected to the transistor 733. The plurality of HSCs 720 may be connected to a plurality of servers of a server rack. The controller 744 may include a processing resource and a memory resource. In a number of examples, the memory resource of the controller 744 may store machine-readable instructions to cause the processing resource to perform 782 and/or 783 of FIG. 7. In a number of examples, the system 715 may perform 782 and/or 783.

In a number of examples, one of or some combination of the controller 744, the transistor 733, the plurality of HSCs 720, an analog-to-digital converter included in the system 715, or another component of the HSC system 715, may perform 782 and/or 783.

At block 782, the controller 744 of the system 715 may determine a quantity of HSCs 720 included in the plurality of HSCs 720. In some implementations, the controller 744 may determine the quantity of HSCs 720 in view of the voltage at the drain of the transistor 733 and in view of the resistance ratio. In a number of examples, the controller 744 may calculate a gain of the transistor 733 in view of the voltage at the drain of the transistor 733. In particular, the controller may calculate the gain of the transistor 733 by dividing a voltage detected at a source of the transistor 733 by the voltage detected at the drain of the transistor, in a number of examples. In a number of examples, the controller 744, when determining the quantity of HSCs 720, may perform a lookup in a lookup table stored in a memory of the controller 744. In a number of examples, the controller 744 may perform the lookup in the below lookup table:

TABLE 1

| Quantity of Hot Swap Controllers (HSCs) | Resistance Ratio = 2 | Resistance Ratio = 2.25 | Resistance Ratio = 2.5 |
| --- | --- | --- | --- |
| 1 | 0.333333 | 0.307692 | 0.285714 |
| 2 | 0.200000 | 0.181818 | 0.166666 |
| 3 | 0.142857 | 0.129032 | 0.117647 |
| 4 | 0.111111 | 0.100000 | 0.090909 |
| 5 | 0.090909 | 0.081632 | 0.074074 |
| 6 | 0.076923 | 0.068965 | 0.062500 |

The controller 744 can determine a quantity of HSCs 720 in view of a gain and a resistance ratio by performing a lookup in the above lookup table. For example, in view of a resistance ratio of 2 and a gain of 0.111111, the controller 744 may determine that there are 4 HSCs 720 in the plurality of HSCs 42. As another example, in view of a resistance ratio of 2.5 and a gain value of 0.117647, the controller 744 may determine that there are three HSCs 720 included in the plurality of HSCs 720. In a number of examples, the resistance ratio and/or the gain may not match an exact value provided in the lookup table, such as table 1 shown above. In such a circumstance, the controller 744 may perform the lookup using closest matches found in the lookup table to approximate a quantity of HSCs 720 in the plurality of HSCs 720. For example, the controller 744 may determine that the resistance ratio is 2.3 and the gain value is 0.120. In such a circumstance, the controller 744 may lookup the resistance ratio of 2.25 since it is closest to 2.3 and a gain value of 0.129032 since it is the closest gain to 0.120 under the resistance ratio of 2.25, to determine that the quantity of HSCs 720 is three.

Additionally, or alternatively, the controller 744, when determining the quantity of HSCs 720, may solve an equation having the resistance ratio, the gain of the transistor 733, and the quantity of HSCs 720 as the three unknown variables, where the quantity of HSCs 720 can be determined in view of a given value for the resistance ratio and the gain of the transistor 733. In a number of examples, the controller 744 may solve the following equation:

$$\text{Gain} = \frac{1}{1 + \text{Quantity of } HSCs \times \text{Resistance Ratio}}$$

For example, the controller may determine that the quantity of HSCs 720 is five in view of a resistance ratio of 2.5 and a gain of 0.074074. In a number of examples, the quantity of HSCs 720 determined in view of the gain and the resistance ratio may not be a whole number and may be rounded to the nearest whole number to determine a quantity of HSCs 720. For example, the controller may determine that the quantity of HSCs 720 is five in view of a resistance ratio of 2.5 and a gain of 0.76.

The controller 744 may utilize a quantity of HSCs 720 included in the plurality of HSCs 720 to calibrate a startup sequence of the plurality of HSCs 720 in order to prevent an inrush of overcurrent that may damage the HSCs 720 and/or the plurality of servers connected thereto.

At block 783, the controller 744 of the system 715 may perform a startup sequence of a plurality of gate drives of the plurality of HSCs 720 in view of a quantity of HSCs 720 included in the HSCs 720. In a number of examples, the controller 744 may determine whether there is an overcurrent event at any of the plurality of HSCs 720. If there is an overcurrent event at one of the plurality of HSCs 720, the controller 744 may disable a gate drive of the HSC 720 experiencing the overcurrent event. In a number of examples, the disabling of the gate drive may be to prevent damage to the plurality of servers.

In a number of examples, if there is not an overcurrent event at any of the plurality of HSCs 720, the controller 744 may determine whether a voltage at an output of each HSC 720 is equal to a voltage at an input of each HSC 720. If the voltage at the output of each HSC 720 is not equal to the voltage at the input of each HSC 720, the controller 744 may perform the startup sequence of the plurality of gate drives of the plurality of HSCs in view of the quantity of HSCs 720 included in the HSCs 720.

In a number of examples, if the voltage at the output of each HSC 720 is equal to the input of each HSC 720, the controller 744 of the HSC system 715 may determine that the startup of the plurality of HSCs 720 is complete. Performing the startup of the plurality of HSCs in view of the quantity of HSCs in the manner described above reduces the likelihood of overcurrent events. In a number of examples, determining the quantity of HSCs in the manner described above allows for the use of a single firmware on server racks having different numbers of HSCs instead of using different firmware depending on customer choice regarding the quantity of HSCs.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things.

What is claimed:

1. A controller, comprising:
   a processing resource; and
   a memory resource storing machine-readable instructions to cause the processing resource to:
   activate a detection signal to enable a transistor coupled to the controller;

determine a voltage associated with a plurality of hot swap controllers;

calculate a resistance ratio by dividing a drain resistance at a drain of the transistor by a sense resistance at one of the plurality of hot swap controllers; and determine, in view of the voltage and in view of the resistance ratio, a quantity of hot swap controllers included in the plurality of hot swap controllers.

2. The controller of claim 1, wherein the processing resource is further to calculate a gain of the transistor in view of the voltage.

3. The controller of claim 2, wherein the processing resource, when determining the quantity of hot swap controllers, is further to:

determine the quantity of hot swap controllers in view of the resistance ratio and in view of the gain of the transistor.

4. The controller of claim 1, wherein the processing resource is further to:

perform startup sequences of gate drives of the plurality of hot swap controllers in view of the quantity of hot swap controllers.

5. The controller of claim 1, wherein the plurality of hot swap controllers are coupled to a plurality of servers.

6. A system, comprising:

a plurality of hot swap controllers;

a transistor connected to the plurality of hot swap controllers; and a controller connected to the transistor to:

activate a detection signal to enable the transistor;

determine a voltage at a drain of the transistor;

calculate a resistance ratio by dividing a drain resistance of the transistor by a sense resistance at one of the plurality of hot swap controllers; and determine, in view of the voltage and in view of the resistance ratio, a quantity of hot swap controllers included in the plurality of hot swap controllers.

7. The system of claim 6, wherein the controller is further to:

calculate a gain of the transistor in view of the voltage; and wherein the controller, when determining the quantity of hot swap controllers included in the plurality of hot swap controllers, is further to:

determine the quantity in view of the resistance ratio and in view of the gain.

8. The system of claim 7, wherein the controller, when determining the quantity of hot swap controllers, is further to perform a lookup in a lookup table stored in a memory of the controller.

9. The system of claim 6, further comprising an analog-to-digital converter that is one of coupled to the controller and integral with the controller.

10. The system of claim 9, wherein the analog-to-digital converter detects the voltage at the drain of the transistor and provides information indicating the voltage to the controller.

11. The system of claim 9, wherein each hot swap controller of the plurality of hot swap controllers comprises:

an input to receive current from a power supply, an output to provide power to a plurality of servers, a transistor between the input and the output, a gate drive coupled to the transistor, a current mirror being used to provide a sense current, and a sense resistor having a sense resistance to measure the sense current.

12. The system of claim 11, wherein the sense current is a fraction of a current being provided to the plurality of servers at the output of each hot swap controller.

13. A system, comprising:

a plurality of hot swap controllers connected to a plurality of servers;

a transistor connected to the plurality of hot swap controllers; and a controller connected to the transistor, wherein the controller is to:

determine a quantity of hot swap controllers included in the plurality of hot swap controllers; and perform a startup sequence of a plurality of gate drives of the plurality of hot swap controllers in view of the quantity of hot swap controllers.

14. The system of claim 13, wherein the controller is further to:

determine whether there is an overcurrent event at the plurality of hot swap controllers; and disable one of the plurality of gate drives in view of whether there is the overcurrent event, wherein the one of the plurality of gate drives is disabled when there is the overcurrent event.

15. The system of claim 13, wherein the one of the plurality of gate drives disabled is experiencing the overcurrent event.

16. The system of claim 13, wherein the controller, when determining the quantity of hot swap controllers, is further to solve an equation having variables for a resistance ratio, a gain of the transistor, and the quantity of hot swap controllers.

17. The system of claim 13, wherein the controller is further to:

determine whether a voltage at an output of each hot swap controller in the plurality of hot swap controllers equals a voltage at an input of each hot swap controller; and determine that a startup of the plurality of hot swap controllers is complete in response to determining whether the voltage at the output equals the voltage at the input of each hot swap controller.

18. The system of claim 13, wherein the controller, when determining the quantity of hot swap controllers, is further to perform a lookup using closest matches found in a lookup table to approximate the quantity of hot swap controllers included in the plurality of hot swap controllers.

* * * * *